June 15, 1954 W. B. LURIE 2,681,435
METER CIRCUIT FOR ERROR INDICATION DEVICES
Filed Jan. 25, 1951
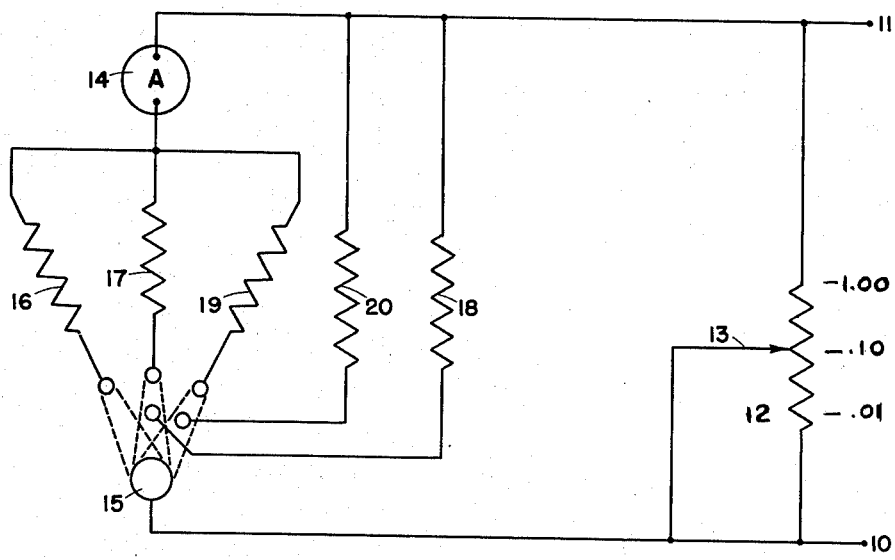
INVENTOR
WILLIAM B. LURIE
BY John C. Dorfman
ATTORNEY Patented June 15, 1954

2,681,435

UNITED STATES PATENT OFFICE 2,681,435

METER CIRCUIT FOR ERROR INDICATION DEVICES

William B. Lurie, Yonkers, N. Y., assignor to Machlett Laboratories, Incorporated, Springdale, Conn., a corporation of Connecticut Application January 25, 1951, Serial No. 207,688

4 Claims. (Cl. 324—115)

This invention relates to a novel metering circuit useful in measuring error impressions of error excited devices. Among its other advantages, this invention makes possible the direct metering of error in absolute units rather than as percentage deviation.

The desire for uniformity in industrial mass produced commodities has made necessary better quality control. Electrical and electronic control circuits and equipment have become common in many industries to indicate when the production items fall below established standards or norms of quality. Most of these circuits are by nature error excited circuits designed to produce an electron signal whenever the physical property to be controlled varies from the established norm.

By their nature some such circuits produce a signal proportional to the percentage variation or deviation from the norm no matter what norm is established. For many uses meter readings in percentage variation from the norm are satisfactory, but for many others they are not, readings in absolute units being preferred. This is particularly true where there are several norms and it is no more difficult to keep within the same absolute tolerances for larger norms than for smaller norms. In such instances, it is easier for the operator to keep within the absolute tolerances if the meter deflection from each of the several norms is indicated in absolute units whose magnitude is the same for all of the norms.

Accordingly, it is the primary object of my invention to provide a meter circuit which is responsive to signals from error excited circuits and which is capable of indicating the same amount of error in the same absolute units with the same meter deflection no matter what norm or standard is chosen.

Another problem common to many metering jobs involves changing the full scale deflection of the meter either to show a wider range of deviation or to provide more accurate readings over a narrower range. In the prior art, attempts to change the deflection of the meter have usually resulted also in a change in the effective resistance of the meter circuit, thereby permitting inaccurate meter readings. Likewise the damping of the meter may be modified by such changes, the damping increasing as the meter shunting resistance is decreased.

Hence, it is another object of my invention to make possible variations in the amount of meter deflection produced by any given amount of error signal without thereby introducing inaccuracy or undue damping into the meter reading. In other words, it is my object to provide several meter scales so that, for different tolerances, it will be possible to read the amount of error to a high degree of accuracy.

For a better understanding of my invention and the functioning thereof a specific embodiment for a particular use, namely thickness gauging of metals or other sheet materials, will be described. Reference is made to the following drawing:

The figure illustrates schematically one possible meter circuit involving my invention.

Referring to the figure terminals 10 and 11 are connected to the output of the error excited circuit. Meter 14 is advantageously a center reading milliameter in order to show both positive and negative error. We are considering a circuit such that, if meter 14 were placed directly across its output terminals, its deflection from the zero or norm position would indicate percentage variation from the norm no matter what norm was chosen. In other words, outside of inaccuracies introduced by such factors as the non-linearity of the circuit, the same amount of deflection would represent the same percentage deviation from any norm selected. In my circuit, to modify this effect, shunt 12 is placed across the line in such a way that tap 13 may be varied in position in order to change the effective resistance of the shunt by by-passing a portion of it. Changing the effective shunt resistance in this way accomplishes two results, namely change of meter sensitivity and correction for non-linearity in the circuit. By thus adjusting the meter sensitivity, the deflecton representing deviation from one norm may be made to correspond to meter deflection for another norm in the identical absolute units. Calibration, as indicated schematically by the numbers 1.00, .10, and .01, may be done empirically by use of samples having known properties, marking the correct setting of the tap 13 for each norm considered. Correction for circuit non-linearity will be automatically accomplished at the same time.

The specific application to thickness gauging provides an ideal example since it is often desired to gauge metal sheet continuously in order to keep within set thickness tolerances at all times. It is mechanically possible to keep metal sheet within essentially the same linear thickness tolerances for different thickness norms. However, while many gauging circuits are so designed that various norm thicknesses will yield the same signal at terminals 10 and 11 due to compensation of the signal in some conventional manner, any variation from the norm will represent percentage deviation from the norm rather than absolute thickness deviation in linear units. The error response is in percentage deviation from the norm because of the essential linearity of the current produced in the gauging circuit with repect to the thickness of the metal being gauged. For example, if no shunt were used and the meter had a full scale deflection equivalent to 5% deviation, the meter would read full scale the tolerance limits of .001 for .020 inch material taken as the norm. But if some other gauge of metal were then used as the norm, 5% deviation would be different, i. e., .0001 inch for .002 inch thickness; and .010 inch for .200 inch thickness. However, by correct positioning of tap 13 in my meter circuit for each norm of metal thickness, meter sensitivity may be so modified that full scale deflection of the meter will represent identically the same amount of deviation in thickness in linear units. In calibrating the meter circuit samples of known thickness may be used. The settings for the tap 13 may then be marked so as to permit simple adjustment in order to gauge metal of any desired thickness norm.

Not only is it desirable to measure deviation from different norms, but it is also usually desirable to have various refinements in the scale so that either a greater degree of deviation may be observed or a lesser degree of deviation may be observed with greater accuracy. Since meter response is dependent upon current reaching it, the same amount of excitation at terminals 10 and 11 would cause only half as much deflection if only half of the current reached the meter; under these circumstances, it would take twice the current to cause full scale deflection. My invention accomplishes this effect by shunting off part of the current in order to give a larger full scale reading. In Fig. 1 double pole switch 15 may connect directly to the meter through lead 16; or it may throw resistance 17 in series and resistance 18 in parallel with the meter; or it may throw resistance 19 in series and resistance 20 in parallel with the meter. In accordance with my invention resistors are selected such that the effective parallel resistance of these resistors and the meter remains constant. The ratio of the resistances in these branches will determine the amount of current which reaches the meter, hence the amount of meter deflection. This ratio thus determines the full scale deflection of the meter so that for each combination of resistors there is a different meter scale. Any number of scales are possible by adding desired resistance combinations.

It will be noted that the meter range may be altered widely by suitable choice of the ratio of the sum of the meter series resistance (meter resistance plus resistance 17 or 19, etc.) to the shunt resistance 18 or 20, etc. Heretofore, meter shunting has been accomplished by placing a resistance directly across the meter, thereby permitting only sufficient current to flow through the meter to cause the proper deflection. Using such a conventional means, it would be possible to keep the total resistance across the error circuit terminals constant by adding series resistance between either of the terminals and the shunt which is across the meter. However, such a system would require a meter shunt of relatively low resistance, since it would be used in parallel with the meter resistance without added series resistance. Placing a low resistance shunt across a meter whose range is thereby greatly changed will often alter the dynamic performance of the meter, thus yielding inaccurate readings. Such change in meter performance is negligible in my invention because of the higher resistance shunts used.

The circuit described is not intended as a limitation upon my invention but is cited merely by way of example. Modifications of my invention, obvious to anyone skilled in the art, are intended to be within its scope and spirit.

I claim:

1. A meter circuit for use in thickness gauges, comprising a pair of terminals, a meter calibrated in linear units of thickness deviation, a plurality of series resistors each connected to one side of the meter, a plurality of parallel resistors each connected to one of the terminals, switch means connected to the other terminal, which switch is capable of simultaneously connecting one of the series resistors in series with the meter across the terminals and one of the parallel resistors directly across said terminals such that each combination of series and parallel resistors has the same effective resistance as the first and second resistors but such that the resistance in series with the meter is changed to permit change in the current through the meter and hence to change the amount of deflection for a given signal across the terminals without disturbing the dynamic performance or damping of the meter, a variable resistance shunt across the terminals, a tap movable to by-pass a portion of the shunt thereby changing its effective resistance, and a calibrated scale indicating various predetermined positions of the tap corresponding to different norms of thickness.

2. A meter circuit for use in thickness gauges, comprising a pair of terminals, a meter calibrated in linear units of thickness deviation, a plurality of series resistors each connected to one side of the meter, a plurality of parallel resistors each connected to one terminal, and switch means connected to the other terminal and capable of simultaneously connecting one of the series resistors in series with the meter across the terminals and one of the parallel resistors directly across said terminals such that each combination of series and parallel resistors has the same effective resistance as the first and second resistance but such that the resistance in series with the meter is changed to permit a change in the current through the meter and hence to change the amount of deflection of the meter for a given signal across the terminals without disturbing the dynamic performance or damping of the meter.

3. A meter circuit for use in error indication devices to measure error, comprising a pair of terminals, a meter calibrated in absolute amounts of error, a plurality of series resistors each connected to one side of the meter, a plurality of parallel resistors each connected to one of the terminals, switch means connected to the other terminal, which switch is capable of simultaneously connecting one of the series resistors in series with the meter across the terminals and one of the parallel resistors directly across said terminals such that each combination of series and parallel resistors has the same effective resistance as the initial combination of series and parallel resistors but such that the resistance in series with the meter is changed to permit change in the current through the meter and hence to change the amount of deflection for a given signal across the terminals without disturbing the dynamic performance or damping of the meter, a variable resistance shunt across the terminals, a tap movable to by-pass a portion of the shunt thereby changing its effective resistance, and a calibrated scale indicating various predetermined positions of the tap corresponding to different norms.

4. A meter circuit for use in error indication devices, comprising a pair of terminals, a meter calibrated in absolute amounts of error, a plurality of series resistors each connected to one side of the meter, a plurality of parallel resistors each connected to one terminal, and switch means connected to the other terminal and capable of simultaneously connecting one of the series resistors in series with the meter across the terminals and one of the parallel resistors directly across said terminals such that each combination of series and parallel resistors has the same effective resistance but such that the resistance in series with the meter is changed to permit a change in the current through the meter and hence to change the amount of deflection of the meter for a given signal across the terminals without disturbing the dynamic performance or damping of the meter.

References Cited in the file of this patent

UNITED STATES PATENTS

| Number | Name | Date |
|---|---|---|
| 1,901,343 | Eastham | Mar. 14, 1933 |
| 2,573,799 | MacLean | Nov. 6, 1951 |

OTHER REFERENCES

Publication I—TM11-1244, War Department Technical Manual "Voltmeter 1S-189." March 22, 1945. Patent Office Library No. TK 6550 .U68 No. 1244. (Copy in Div. 69.) Class 171-95-7.

Publication II—"Vacuum Tube Voltmeters" by John F. Rider, John F. Rider Publisher, Inc., New York, N. Y. February 1941. (In Div. 69.)